United States Patent
Bailie et al.

(10) Patent No.: US 9,457,864 B2
(45) Date of Patent: Oct. 4, 2016

(54) INTEGRATED FOLDING BIKE SYSTEM

(71) Applicant: GM Global Technology Operations LLC, Detroit, MI (US)

(72) Inventors: Jess R. Bailie, Shelby Township, MI (US); Lawrence G. Cole, Utica, MI (US); Brett Crockett, Ortonville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/625,195

(22) Filed: Feb. 18, 2015

(65) Prior Publication Data
US 2016/0236744 A1    Aug. 18, 2016

(51) Int. Cl.
*B62K 15/00* (2006.01)

(52) U.S. Cl.
CPC ....... *B62K 15/008* (2013.01); *B62K 2015/001* (2013.01); *B62K 2015/003* (2013.01)

(58) Field of Classification Search
CPC ... B62K 15/00; B62K 15/006; B62K 15/008
See application file for complete search history.

(56) References Cited

U.S. PATENT DOCUMENTS

| | | | | |
|---|---|---|---|---|
| 4,440,414 A * | 4/1984 | Wang | ............... | B62K 15/008 280/278 |
| 6,267,401 B1 * | 7/2001 | De Jong | ............ | B62K 15/008 280/287 |
| 7,306,249 B2 * | 12/2007 | Kwok | ............... | B62K 15/008 280/278 |
| 8,801,009 B2 * | 8/2014 | Sapir | ............... | B62K 3/002 280/87.05 |
| 9,150,272 B1 * | 10/2015 | Thompson | ............ | B62K 15/008 |
| 2015/0209205 A1 * | 7/2015 | Ransenberg | ......... | B62K 15/008 280/641 |
| 2016/0016627 A1 * | 1/2016 | Thompson | ............ | B62M 6/45 180/206.2 |
| 2016/0016628 A1 * | 1/2016 | Thompson | ............ | B62K 15/008 180/220 |
| 2016/0016629 A1 * | 1/2016 | Wang | ............... | B62K 15/00 180/208 |
| 2016/0016630 A1 * | 1/2016 | Thompson | ............ | B62K 15/008 280/287 |

* cited by examiner

*Primary Examiner* — Kevin Hurley
(74) *Attorney, Agent, or Firm* — BrooksGroup

(57) ABSTRACT

A number of variations may include a product comprising a bicycle with an integrated folding system comprising: a first latch system in a stem of the bicycle; a second latch system in a headset of the bicycle; a third latch system in a frame of the bicycle; and wherein the first latch system, the second latch system, and the third latch system work simultaneously to fold the bicycle to a compact size.

19 Claims, 4 Drawing Sheets

INTEGRATED FOLDING BIKE SYSTEM

TECHNICAL FIELD

The field to which the disclosure generally relates to includes bicycles.

BACKGROUND

A bicycle may include a folding system.

SUMMARY OF ILLUSTRATIVE VARIATIONS

One variation may include a product comprising a bicycle with an integrated folding system comprising: a first latch system in a stem of the bicycle; a second latch system in a headset of the bicycle; a third latch system in a frame of the bicycle; and wherein the first latch system, the second latch system, and the third latch system work simultaneously to fold the bicycle to a compact size.

Another variation may include a method comprising folding a bicycle comprising: integrating a bicycle with a first latch system, a second latch system, and a third latch system; lowering a seat from a raised position to a lowered position; pulling on a handle on a steerer tube to activate the first latch system, the second latch system, and the third latch system; wherein activating the first latch system causes a first handle bar and a second handle bar to rotate backwards; wherein activating the second latch system allows a steerer tube to fold downward toward a frame; wherein activating the third latch system causes the frame to fold; and wherein the first latch system, the second latch system, and the third latch system work simultaneously to fold the bicycle.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

FIGS. 1-21 illustrate a number of variations including a bicycle with an integrated folding system 44. In a number of variations, a bicycle with an integrated folding system 44 may allow an operator to fold the bicycle 44 so that the bicycle 44 may be easier to transport and/or store. The bicycle with an integrated bicycle folding system 44 may comprise three independent latch/hinge systems 46, 48, 50 which may be activated simultaneously to fold the bicycle 44. This may allow an operator to fold the bicycle 44 quickly and easily. Any number of bicycles 44 may include the integrated folding system including, but not limited to, manually operated bicycles or self-propelled bicycles such as electric bicycles.

Figure 1:
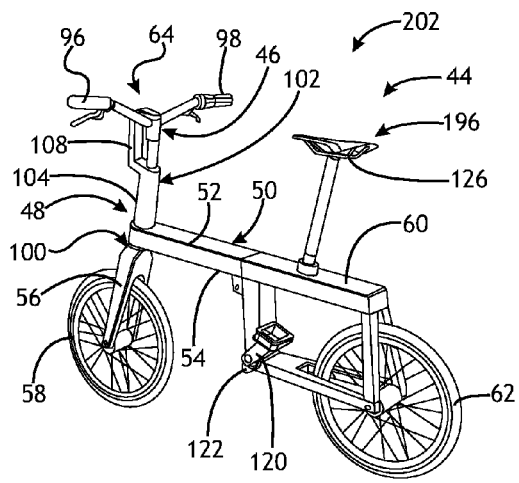
FIG. 1 illustrates a perspective view of a bicycle with an integrated folding system according to a number of variations.

Referring to FIG. 1, in a number of variations, a bicycle with an integrated folding system 44 may include a frame 52. The frame 52 may include a front fork 56 which may be operatively connected to a front wheel 58 and a rear extension 60 which may be operatively connected to a rear wheel 62. In a number of variations, the bicycle 44 may include a headset area 100 where the steerer tube 102 may be operatively connected to the front fork 56. In a number of variations, a bicycle 44 may also include a stem area 64 where the handle bars 96, 98 may be attached to the steerer tube 102 so that the handle bars 96, 98 may be used to control the direction of the front wheel 58. The underside 54 of the frame 52 may include a first pedal assembly 120 and a second pedal assembly 122 which may be located between the front wheel 58 and the rear wheel 62 and may be operatively connected to the rear wheel 62. In one variation, a motor (not illustrated) may be operatively attached to the first and second pedal assemblies 120, 122 and may be used to automatically rotate the first and second pedal assemblies 120, 122. An adjustable seat 126 may be attached to the frame 52 and may be located adjacent the first and second pedal assemblies 120, 122 on the rear extension 60.

In a number of variations, the first latch system 46 may be located in the stem area 64 where the handle bars 96, 98 attach to the steerer tube 102, the second latch system 48 may be located in the headset area 100 where the steerer tube 102 may be attached to the front fork 56 of the frame 52, and the third latch system 50 may be located in the frame 52 approximately central of the rear extension 60.

Figure 5:
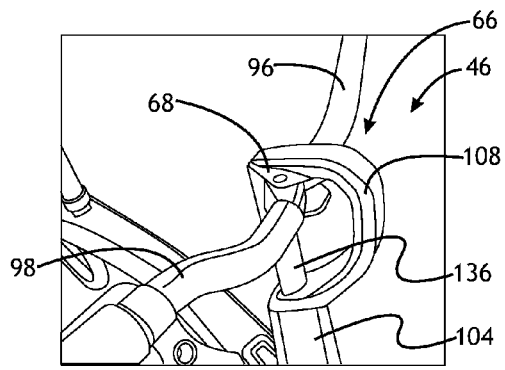
FIG. 5 illustrates a close-up perspective view of a first latch system according to a number of variations.
Figure 6:
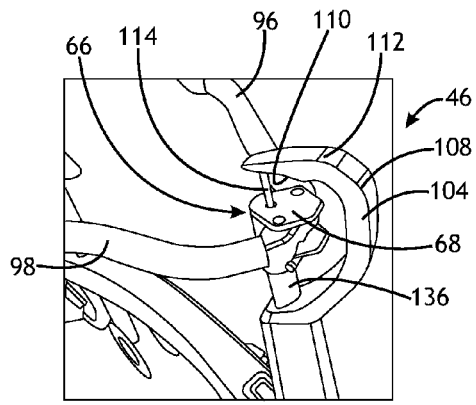
FIG. 6 illustrates a close-up perspective view of a first latch system according to a number of variations.
Figure 7:
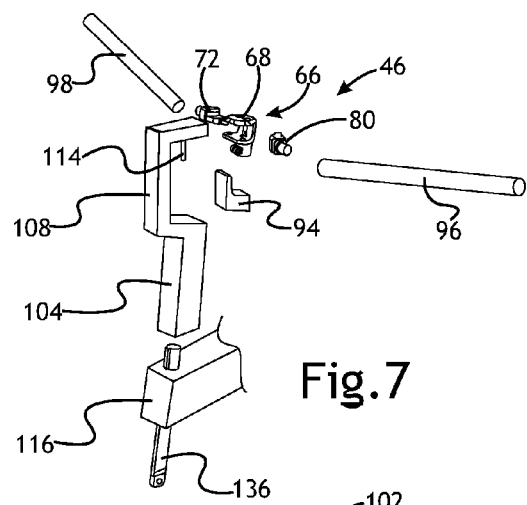
FIG. 7 illustrates an exploded view of a stem area of a bicycle with an integrated folding system according to a number of variations.
Figure 8:
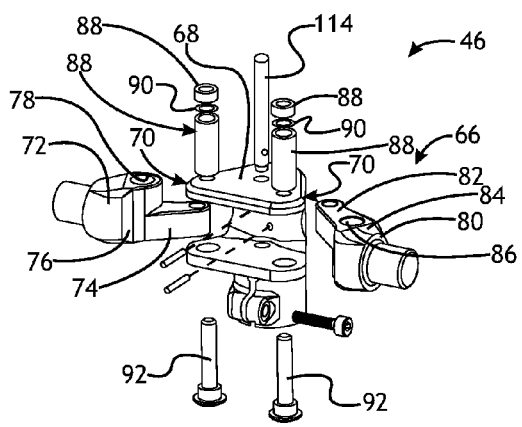
FIG. 8 illustrates an exploded view of a stem according to a number of variations.

Referring to FIGS. 2, 3, and 5-8, in a number of variations, the first latch system 46 may include a knuckle joint 66. The knuckle joint 66 may include a stem 68, variations of which are illustrated in FIGS. 7 and 8, which may connect a first and a second handle bar 96, 98 to the steerer tube 102. The stem 68 may include a first rotator component 72 and a second rotator component 80 which may be rotatably attached to opposing ends 70 of the stem 68, a variation of which is illustrated in FIG. 8, and may be constructed and arranged to attach to the first and second handle bars 96, 98, respectively. The first rotator component 72 may include an extension 74 which may extend from a lower portion 76 of the first rotator component 72 and may include a through-hole 78 which may be constructed and arranged to accommodate a shear pin 114, as will be discussed hereafter. The second rotator component 80 may include an extension 82 which may extend from an upper portion 84 of the second rotator component 80 and may include a through-hole 86 which may also be constructed and arranged to accommodate the shear pin 114, as will be discussed hereafter. In a number of variations, the extensions 74, 82 on the first rotator component 72 and the second rotator component 80 may be constructed and arranged so that they may overlap each other so that the through-holes 78, 86 on each of the first and second rotator components 72, 80 may align to accommodate the shear pin 114 which may be attached to the upper frame member 104, as will be discussed hereafter. The first rotator component 72 and the second rotator component 80 may be attached to the stem 68 in any number of variations including, but not limited to, one or more mechanical fasteners such as one or more rotator sleeves 88, one or more washers 90, and a pin 92, a variation of which is illustrated in FIG. 8. In a number of variations, a stem cover 94, a variation of which is illustrated in FIG. 7, may be attached to the stem 68. The stem cover 94 may be attached to the stem 68 in any number of variations including, but not limited to, snap fit onto the stem 68.

Figure 9:
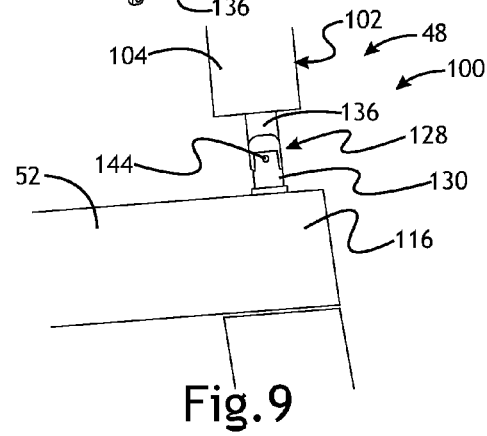
FIG. 9 illustrates a close-up perspective view of a second latch system according to a number of variations.
Figure 10:
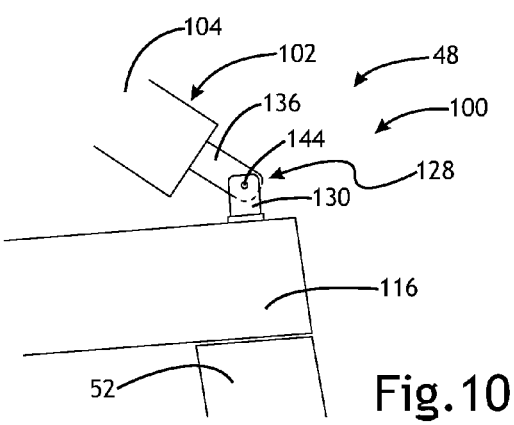
FIG. 10 illustrates a close-up perspective view of a second latch system according to a number of variations.
Figure 11:
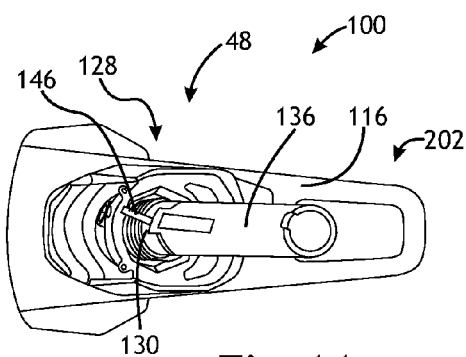
FIG. 11 illustrates a plan view of a second latch system according to a number of variations.
Figure 19:
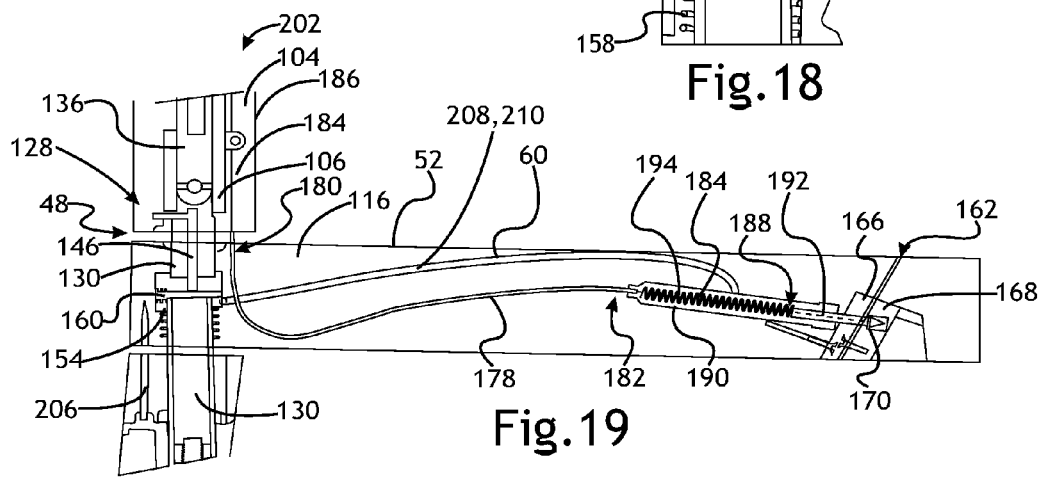
FIG. 19 illustrates a section view of a bicycle with an integrated folding system according to a number of variations.

Referring to FIGS. 9 and 10, in a number of variations, the steerer tube 102 may include an upper shaft 136, a lower shaft 130, a lower frame member 116 and an upper frame member 104. The upper frame member 104 and the lower frame member 116 may enclose at least a portion of the upper shaft 136 and the lower shaft 130. In a number of variations, the lower frame member 116 may be attached to the frame 52. In a number of variations, the upper frame member 104 may extend over the stem 68 and may be moveably attached to the upper shaft 136 so that it may move upward and downward along the steerer tube shafts 130, 136, variations of which are illustrated in FIGS. 5 and 6. The upper frame member 104 may include a collar 106, a variation of which is illustrated in FIG. 19. In a number of variations, the upper frame member 104 may include a handle 108, a variation of which is illustrated in FIG. 7. The handle 108 may be part of the upper frame member 104 so that the handle 108 and upper frame member 104 are one continuous component, or in another variation, the handle 108 may be a separate component attached to the upper frame member 104. In a number of variations, a shear pin 114 may extend from the underside 110 of a top portion 112 of the upper frame member 104, a variation of which is illustrated in FIG. 6, and may be constructed and arranged to extend through the through-holes 78, 86 in the first and second rotator components 72, 80 when the bicycle 44 is in an unfolded position 202 which may prevent the handle bars 96, 98 from rotating to a folded position 200.

Referring to FIG. 6, in a number of variations, an operator may lift the handle 108 which may cause the shear pin 114 to lift out of the stem 68 which may allow the first and second rotator components 72, 80 to freely rotate backwards which may allow the handle bars 96, 98 to rotate backward.

Figure 14:
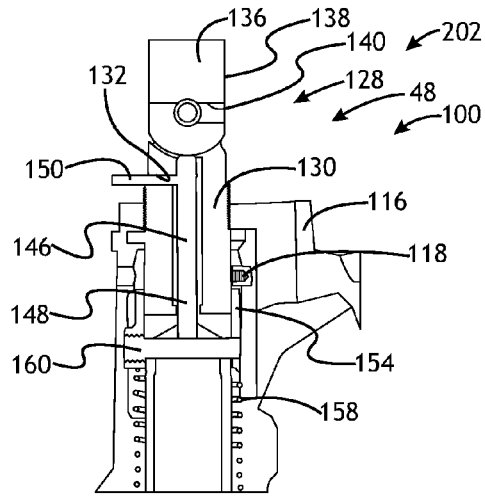
FIG. 14 illustrates a section view of a second latch system according to a number of variations.
Figure 18:
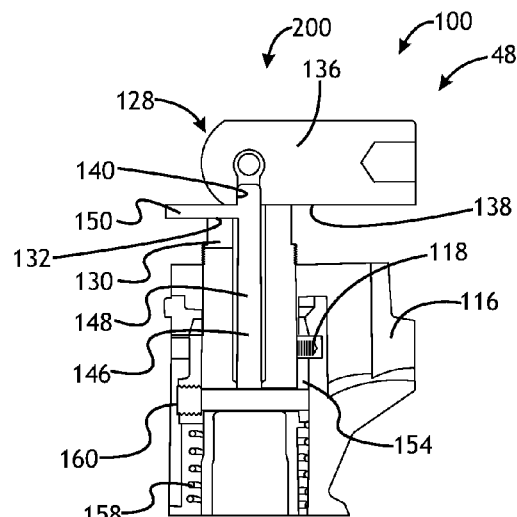
FIG. 18 illustrates a section view of a second latch system according to a number of variations.

Referring to FIGS. 9-19, in a number of variations, the second latch system 48 may include a hinge feature 128 in the headset area 100. The steerer tube 102 may include a lower shaft 130 and an upper shaft 136 which may be pivotally attached together in any number of variations including, but not limited to, a pin 144, variations of which are illustrated in FIGS. 9 and 10. In a number of variations, the lower shaft 130 may be rotatably attached to the frame 52 and may extend through the lower frame member 116, a variation of which is illustrated in FIG. 9. The lower shaft 130 may include a shaft lock pin 146 which may extend approximately central of the lower shaft 130, a variation of which is illustrated in FIGS. 14 and 18, which may be constructed and arranged to lock the steerer tube 102 in a folded position, as will be discussed hereafter. The shaft lock pin 146 may include a body 148 and an arm 150 which may extend approximately perpendicular to the body 148. The shaft lock pin 146 and arm 150 may be any number of shapes including, but not limited to, cylindrical. The lower shaft 130 may include a cutout 132 which may allow a portion of the arm 150 of the shaft lock pin 146 to extend out of the lower shaft 130 so that it may be accessed by an operator, a variation of which is illustrated in FIG. 14. A side surface 138 of the upper shaft 136 may include an opening 140 which may be any number of shapes including, but not limited to, cylindrical, and may be constructed and arranged to accommodate a portion of the shaft lock pin 146 so that when the steerer tube 102 may be folded, the steerer tube 102 may be locked into a folded position 200, as will be discussed hereafter.

Figure 16:
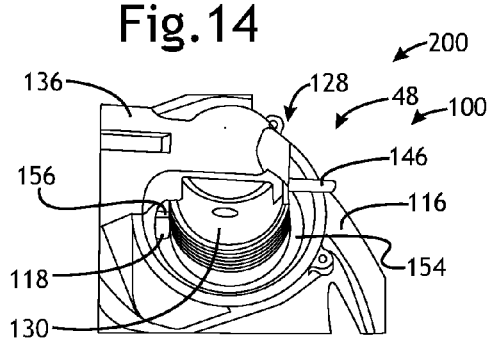
FIG. 16 illustrates a close-up perspective view of a second latch system according to a number of variations.
Figure 17:
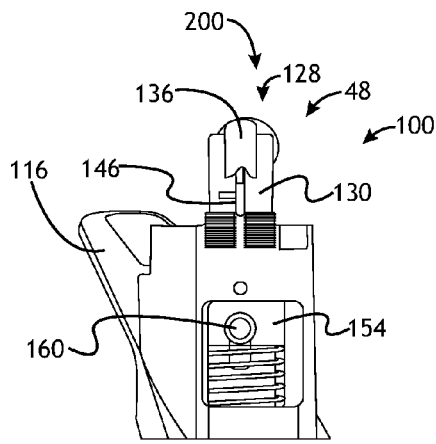
FIG. 17 illustrates a close-up front view of a second latch system according to a number of variations.

Referring to FIGS. 14 and 18, in a number of variations the lower shaft 130 may include a shaft lock collar 154 which may wrap around a portion of the lower shaft 130 and may be operatively connected to a spring 158. In a number of variations, the shaft lock collar 154 may include a groove or opening 156 (a variation of which is illustrated in FIG. 16) which may be constructed and arranged to accommodate an angle lock pin 118 as will be discussed hereafter. A collar pin 160 may be attached to the shaft lock collar 154 and may extend through the shaft lock collar 154 and the lower shaft 130. In a number of variations, the collar pin 160 may move vertically within the lower shaft 130 when the bicycle 44 may be moved from an unfolded position 202 to a folded position 200 and vice versa. The lower frame member 130 may also include an angle lock pin 118 which may extend from the lower frame member 130 and which may lock the steerer tube 102 at an angle 204 as will be discussed hereafter. In a number of variations, the collar pin 160 may be operatively connected to the shaft lock pin 146.

Figure 12:
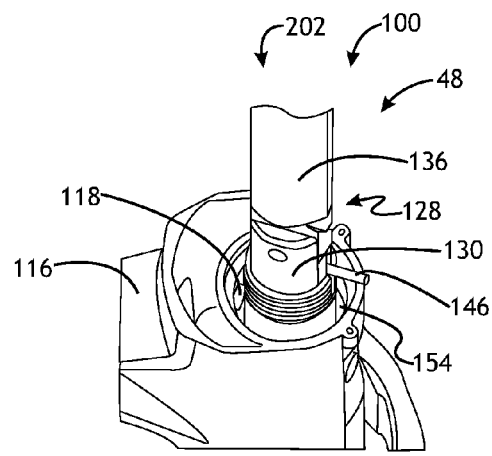
FIG. 12 illustrates a close-up perspective view of a second latch system according to a number of variations.
Figure 13:
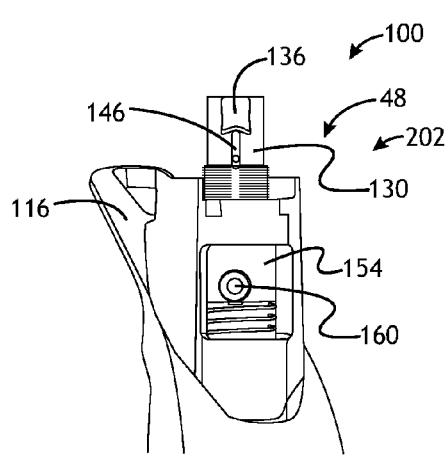
FIG. 13 illustrates a close-up front view of a second latch system according to a number of variations.

Referring to FIGS. 12 and 14, in a number of variations, when the bicycle 44 may be in an unfolded position 202, the upper shaft 136 and the lower shaft 130 of the steerer tube 102 may be aligned and enclosed by the upper frame member 104. In the unfolded position 202, the upper shaft 136 may push the shaft lock pin 146 downward which may cause the collar pin 160 and the shaft lock collar 154 to be in a downward position so that the angle lock pin 118 may be seated out of the shaft lock collar 154. This may allow an operator to turn the handle bars 96, 98 and steerer tube 102 to control the direction of the front wheel 58.

Figure 2:
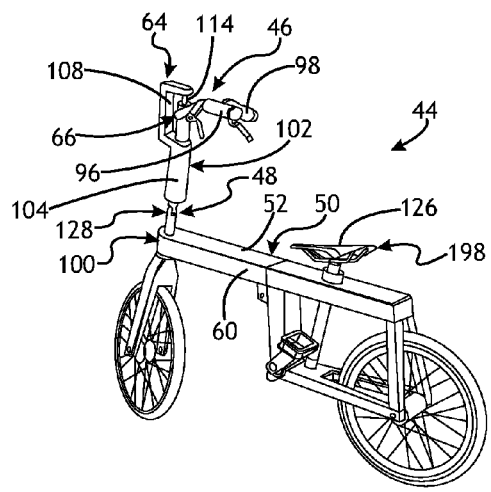
FIG. 2 illustrates a perspective view of a bicycle with an integrated folding system according to a number of variations.

Referring to FIGS. 2 and 18, in a number of variations, when the handle 108 on the upper frame member 104 is lifted upward (as illustrated in FIG. 2), the steerer tube hinge feature 128 may be exposed which may allow the upper shaft 136 to rotate downward so that the upper shaft 136 may be substantially 90 degrees or perpendicular to the lower shaft 130 (as illustrated in FIG. 18). This may cause the opening 140 in the upper shaft 136 to align with the shaft lock pin 146. In a number of variations, the force from the spring 158 operatively connected to the shaft lock collar 154 may cause the collar pin 160 and shaft collar 154 to move upward which may cause the shaft lock pin 146 to move upward into the opening 140 in the upper shaft 136 which may lock the upper shaft 136 in the approximately perpendicular position.

Figure 15:
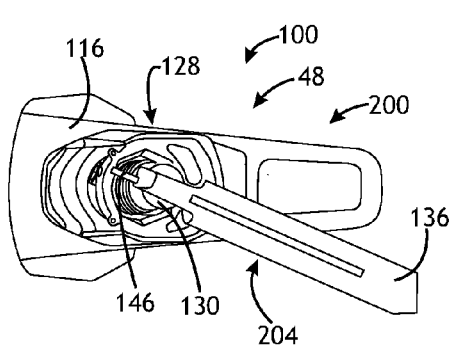
FIG. 15 illustrates a plan view of a second latch system according to a number of variations.

Referring to FIG. 15, in a number of variations, the steerer tube 102 may be rotated to an angled position 204 to assist in the folding of the bicycle 44. The upward movement of the shaft lock collar 154 and collar pin 160 may also cause the shaft lock collar 154 to move upward so that the angle lock pin 118 may be seated in a groove 156 in the shaft lock collar 154 so that the lower shaft 130 may be locked in the angled position 204 and prevented from rotating. The angle of the lower shaft 130 may be locked at any number of positions depending on the construction of the bicycle 44. In one variation, the lower shaft 130 may be locked at an approximate 23 degree angle.

Referring to FIG. 18, in a number of variations, an operator may unlock the bicycle 44 from the folded position 200 by pushing downward on the arm 150 of the shaft lock pin 146 which may cause the shaft lock pin 146 to move downward out of the opening 140 in the upper shaft 136 which may allow the upper shaft 136 to be rotated upward so that the upper and lower shafts 130, 136 may be aligned and enclosed by the upper frame member 104. The downward movement of the shaft lock pin 146 may also cause the shaft lock collar 154 and collar pin 160 to move back to a downward position below the angle lock pin 118 so that the steerer tube 102 may rotate freely.

Figure 20:
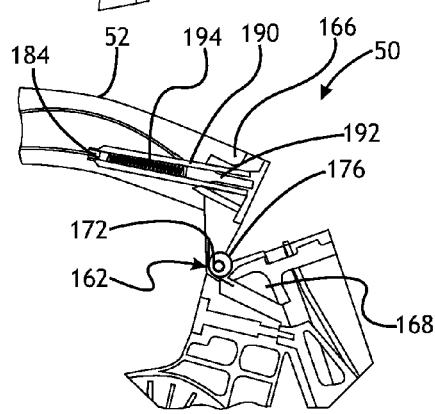
FIG. 20 illustrates a close-up side view of a third latch system according to a number of variations.
Figure 21:
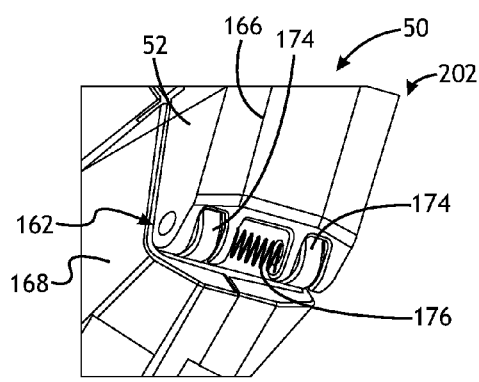
FIG. 21 illustrates a close-up perspective view of a third latch system according to a number of variations.

Referring to FIGS. 19-22, in a number of variations, the third latch system 50 may be located in the rear extension 60 of the frame 52. The rear extension 60 may include a main hinge 162 which may be located approximately central of the rear extension 60. The main hinge 162 may include a first frame hinge component 166 and a second frame hinge component 168 which may be rotatably attached by one or more mechanical fasteners including, but not limited to, a pin 172, a variation of which is illustrated in FIG. 20, and one or more roller joints 174, variations of which are illustrated in FIG. 21. A spring 176 may be operatively connected to the first frame hinge component 166 and the second frame hinge component 168, variations of which are illustrated in FIGS. 20 and 21, so that when the main hinge 162 is folded open, the spring 176 may further assist in folding the frame 52. In a number of variations, a cable 184 may extend through a cable tube 178 which may be located inside a portion of the frame 52. The cable tube 178 may include a first end 180 which may be attached to the lower frame member 116 and a second end 182 which may be attached to a latch pin tube 190, a variation of which is illustrated in FIG. 19. The cable 184 may include a first end 186 which may be attached to a lock collar 106 on the upper frame member 104, and a second end 188 which may be attached to a spring-loaded latch pin 192, a variation of which is also illustrated in FIG. 19. The cable 184 may be attached to the upper frame member collar 106 and spring-loaded latch pin 192 in any number of variations including, but not limited to, one or more mechanical fasteners (not illustrated). The cable tube 178 may be attached to the lower frame member 116 and the latch pin tube 190 in any number of variations including, but not limited to, one or more mechanical fasteners (not illustrated).

Referring to FIGS. 19 and 20, in a number of variations, the first frame hinge component 166 may be constructed and arranged to accommodate a latch pin tube 190. The latch pin 192 may be moveably seated in the latch pin tube 190. A spring 194 may be located forward of the latch pin 192 and may be operatively attached to the latch pin 192 so that when the bicycle 44 is in an unfolded position 202, the force of the spring 194 pushes a portion of the latch pin 192 into an opening 170 in the second frame hinge component 168, a variation of which is illustrated in FIG. 19 which may lock the first frame hinge component 166 and the second frame hinge component 168 together.

Referring again to FIG. 19, in a number of variations, the frame 52 may be constructed and arranged to conceal the front brake cable 206, the shifter cable 208, and the rear brake cable 210.

Referring to FIGS. 2, 20, and 21, in a number of variations, the handle 108 on the upper frame member 104 may be lifted (as illustrated in FIG. 2) which may cause the cable 184 attached to the steerer tube lock collar 106 on the upper frame member 104 to be lifted upward which may pull the cable 184 upward which may cause the latch pin 192 to move out of the second frame hinge component 168 which may unlock the first frame hinge component 166 from the second frame hinge component 168 and may allow the frame 52 to fold (as illustrated in FIG. 20). The force of the spring 176 variations of which are illustrated in FIGS. 20 and 21, in the main hinge 162 may further assist in folding the frame 52.

Figure 3:
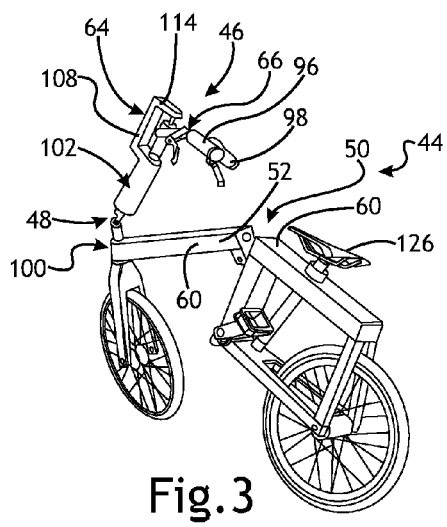
FIG. 3 illustrates a perspective view of a bicycle with an integrated folding system partially folded according to a number of variations.
Figure 4:
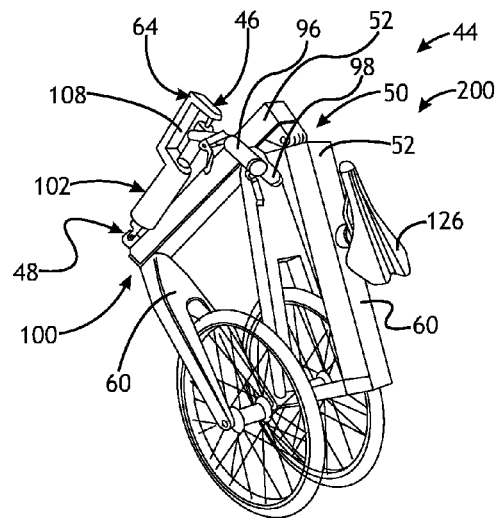
FIG. 4 illustrates a perspective view of a bicycle with an integrated folding system in a folded position according to a number of variations.

Referring to FIGS. 1-4, in a number of variations, an operator may fold the bicycle 44 to a more compact size. In a number of variations, the operator may first lower the adjustable seat 126 from a raised position 196 to a lowered position 198, variations of which are illustrated in FIGS. 1 and 2. The operator may then pull upward on the handle 108 which may cause the shear pin 114 extending from the handle 108 into the stem 68 to lift out of the stem 68 which may allow the first and second handle bars 96, 98 to move backward and toward each other, variations of which are illustrated in FIGS. 2 and 3. Simultaneously, as the handle 108 is pulled upward, the steerer tube hinge feature 128 may be exposed which may allow the steerer tube 102 to fold downward and at an angled position 204. The steerer tube 102 may then be locked into the folded position 200. Also simultaneously, as the handle 108 is pulled upward, the latch pin 192 may pull out from inside of the first hinge component 166 which may cause the frame 52 to fold. The simultaneous tri-latching systems 46, 48, 50 may allow an operator to fold a bicycle 44 in a single quick and simple step. The bicycle 44 may be constructed and arranged so that in the folded position 200, the operator may carry or roll the bicycle 44 in a folded position 200 by the handle 108.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a bicycle with an integrated folding system comprising: a first latch system in a stem of the bicycle; a second latch system in a headset of the bicycle; a third latch system in a frame of the bicycle; and wherein the first latch system, the second latch system, and the third latch system work simultaneously to fold the bicycle to a compact size.

Variation 2 may include a product as set forth in Variation 1 further comprising a handle constructed and arranged so that pulling the handle upward activates the first latch system, the second latch system, and the third latch system.

Variation 3 may include a product as set forth in any of Variations 1-2 wherein the bicycle is constructed and arranged so that when it is folded to the compact size, the bicycle can be rolled by a handle or carried by the handle.

Variation 4 may include a product as set forth in any of Variations 1-3 wherein the first latch system is constructed and arranged so that when the first latch system is activated, a first handle bar and a second handle bar fold backward and toward each other.

Variation 5 may include a product as set forth in any of Variations 1-4 wherein the second latch system is constructed and arranged so that when the second latch system is activated, a steerer tube folds backward and toward the frame of the bicycle.

Variation 6 may include a product as set forth in any of Variations 1-5 wherein the third latch system is constructed and arranged so that when the third latch system is activated, a hinge in the frame folds open causing the frame to fold.

Variation 7 may include a product as set forth in any of Variations 1-6 wherein the frame is constructed and arranged to conceal at least one cable.

Variation 8 may include a product as set forth in any of Variations 1-7 wherein the steerer tube is constructed and arranged to lock into a folded position.

Variation 9 may include a product as set forth in any of Variations 1-8 wherein the steerer tube is constructed and arranged to rotate at an angle in a folded position.

Variation 10 may include a product as set forth in any of Variations 1-9 wherein the steerer tube is constructed and arranged to lock at the angle in the folded position.

Variation 11 may include a product as set forth in any of Variations 1-10 wherein the first latch system includes a knuckle joint.

Variation 12 may include a product as set forth in Variation 11 wherein the knuckle joint comprises a stem, a first handle bar and a second handle bar rotatably attached to the stem; a shear pin, wherein the shear pin is constructed and arranged to extend through the stem in an unfolded position to lock the first handle bar and the second handle bar in the unfolded position and wherein in a folded position, the shear pin is lifted out from the stem causing the first handle bar and the second handle bar to rotate backward and toward each other.

Variation 13 may include a product as set forth in any of Variations 1-12 wherein the second latch system comprises a hinge feature in the steerer tube.

Variation 14 may include a product as set forth in Variation 13 wherein the steerer tube comprises an upper shaft and a lower shaft pivotally attached to each other; an upper frame member moveably attached to the upper shaft; a lower frame member attached to the frame; and wherein the second latch system is constructed and arranged so that when the second latch system is activated, the upper frame member is lifted upward which allows the upper shaft to pivot downward approximately perpendicular to the lower shaft in a folded position.

Variation 15 may include a product as set forth in any of Variations 1-14 wherein the lower shaft further comprises a spring-loaded lock pin, wherein the spring-loaded lock pin is constructed and arranged so that in the folded position the spring-loaded lock pin engages an opening in the upper shaft and locks the steerer tube in the folded position, and wherein when the spring-loaded lock pin is pushed downward, the spring-loaded lock pin is removed from the opening so that the upper shaft is unlocked from the folded position.

Variation 16 may include a product as set forth in any of Variations 1-15 wherein the lower shaft further comprises a spring-loaded shaft collar with a collar pin operatively connected to the spring-loaded lock pin, wherein the spring-loaded shaft collar includes a groove constructed and arranged to accommodate an angle lock pin extending from the lower frame member so that when the bicycle is in an unfolded position, the spring-loaded shaft collar is pushed downward from the spring-loaded lock pin so that the angle lock pin is not engaged in the groove and wherein in a folded position the spring-loaded collar is pushed upward so that the angle lock pin is seated in the groove so that the steerer tube is locked into place.

Variation 17 may include a product as set forth in any of Variations 1-16 wherein the third latch system includes a main hinge feature in the frame.

Variation 18 may include a product as set forth in any of Variations 1-17 wherein the main hinge feature comprises: a first frame component and a second frame component, wherein the first frame component and the second frame component are pivotally attached to each other; a cable which extends through the frame, wherein a first end of the cable is attached to a steerer tube and a second end is attached to a spring-loaded latch pin; wherein in an unfolded position the spring-loaded latch pin extends between the first frame component and the second frame component which holds the frame together in an unfolded position, and wherein the spring-loaded latch pin is constructed and arranged so that when the third latch system is activated, the cable is lifted upward which pulls the spring-loaded latch pin out of the second frame component so that the frame folds together to a folded position.

Variation 19 may include a product as set forth in any of Variations 1-18 wherein the main hinge feature further comprises a spring which is constructed and arranged to fold the frame together when the third latch system is activated.

Variation 20 may include a method comprising: folding a bicycle comprising: integrating a bicycle with a first latch system, a second latch system, and a third latch system; lowering a seat from a raised position to a lowered position; pulling on a handle on a steerer tube to activate the first latch system, the second latch system, and the third latch system; wherein activating the first latch system causes a first handle bar and a second handle bar to rotate backwards; wherein activating the second latch system allows a steerer tube to fold downward toward a frame; wherein activating the third latch system causes the frame to fold; and wherein the first latch system, the second latch system, and the third latch system work simultaneously to fold the bicycle.

The above description of select variations within the scope of the invention is merely illustrative in nature and, thus, variations or variants thereof are not to be regarded as a departure from the spirit and scope of the invention.

What is claimed is:

1. A product comprising:
a bicycle with an integrated folding system comprising:
a first latch system in a stem of the bicycle;
a second latch system in a headset of the bicycle;
a third latch system in a frame of the bicycle;
a handle constructed and arranged so that pulling the handle upward activates the first latch system, the second latch system, and the third latch system; and
wherein the first latch system, the second latch system, and the third latch system work simultaneously to fold the bicycle to a compact size.

2. The product of claim 1 wherein the bicycle is constructed and arranged so that when it is folded to the compact size, the bicycle can be rolled by the handle or carried by the handle.

3. The product of claim 1 wherein the first latch system is constructed and arranged so that when the first latch system is activated, a first handle bar and a second handle bar fold backward and toward each other.

4. The product of claim 1 wherein the second latch system is constructed and arranged so that when the second latch system is activated, a steerer tube folds backward and toward the frame of the bicycle.

5. The product of claim 1 wherein the third latch system is constructed and arranged so that when the third latch system is activated, a hinge in the frame folds open causing the frame to fold.

6. The product of claim 1 wherein the frame is constructed and arranged to conceal at least one cable.

7. The product of claim 4 wherein the steerer tube is constructed and arranged to lock into a folded position.

8. The product of claim 4 wherein the steerer tube is constructed and arranged to rotate at an angle in a folded position.

9. The product of claim 8 wherein the steerer tube is constructed and arranged to lock at the angle in the folded position.

10. The product of claim 1 wherein the first latch system includes a knuckle joint.

11. The product of claim 10 wherein the knuckle joint comprises a stem, a first handle bar and a second handle bar rotatably attached to the stem; a shear pin, wherein the shear pin is constructed and arranged to extend through the stem in an unfolded position to lock the first handle bar and the second handle bar in the unfolded position and wherein in a folded position, the shear pin is lifted out from the stem causing the first handle bar and the second handle bar to rotate backward and toward each other.

12. The product of claim 1 wherein the second latch system comprises a hinge feature in the steerer tube.

13. The product of claim 12 wherein
the steerer tube comprises an upper shaft and a lower shaft pivotally attached to each other;
an upper frame member moveably attached to the upper shaft;
a lower frame member attached to the frame; and
wherein the second latch system is constructed and arranged so that when the second latch system is activated, the upper frame member is lifted upward which allows the upper shaft to pivot downward approximately perpendicular to the lower shaft in a folded position.

14. The product of claim 13 wherein the lower shaft further comprises a spring-loaded lock pin, wherein the spring-loaded lock pin is constructed and arranged so that in the folded position the spring-loaded lock pin engages an opening in the upper shaft and locks the steerer tube in the folded position, and wherein when the spring-loaded lock pin is pushed downward, the spring-loaded lock pin is removed from the opening so that the upper shaft is unlocked from the folded position.

15. The product of claim 14 wherein the lower shaft further comprises a spring-loaded shaft collar with a collar pin operatively connected to the spring-loaded lock pin, wherein the spring-loaded shaft collar includes a groove constructed and arranged to accommodate an angle lock pin extending from the lower frame member so that when the bicycle is in an unfolded position, the spring-loaded shaft collar is pushed downward from the spring-loaded lock pin so that the angle lock pin is not engaged in the groove and wherein in a folded position the spring-loaded collar is pushed upward so that the angle lock pin is seated in the groove so that the steerer tube is locked into place.

16. The product of claim 1 wherein the third latch system includes a main hinge feature in the frame.

17. The product of claim 16 wherein the main hinge feature comprises:
a first frame component and a second frame component, wherein the first frame component and the second frame component are pivotally attached to each other;
a cable which extends through the frame, wherein a first end of the cable is attached to a steerer tube and a second end is attached to a spring-loaded latch pin; and
wherein in an unfolded position the spring-loaded latch pin extends between the first frame component and the second frame component which holds the frame together in an unfolded position, and wherein the spring-loaded latch pin is constructed and arranged so that when the third latch system is activated, the cable is lifted upward which pulls the spring-loaded latch pin out of the second frame component so that the frame folds together to a folded position.

18. The product of claim 17 wherein the main hinge feature further comprises a spring which is constructed and arranged to fold the frame together when the third latch system is activated.

19. A method comprising:
folding a bicycle comprising:
integrating a bicycle with a first latch system, a second latch system, and a third latch system;
lowering a seat from a raised position to a lowered position;
pulling on a handle on a steerer tube to activate the first latch system, the second latch system, and the third latch system;
wherein activating the first latch system causes a first handle bar and a second handle bar to rotate backwards;
wherein activating the second latch system allows a steerer tube to fold downward toward a frame;
wherein activating the third latch system causes the frame to fold; and
wherein the first latch system, the second latch system, and the third latch system work simultaneously to fold the bicycle.

* * * * *